Figure 1:
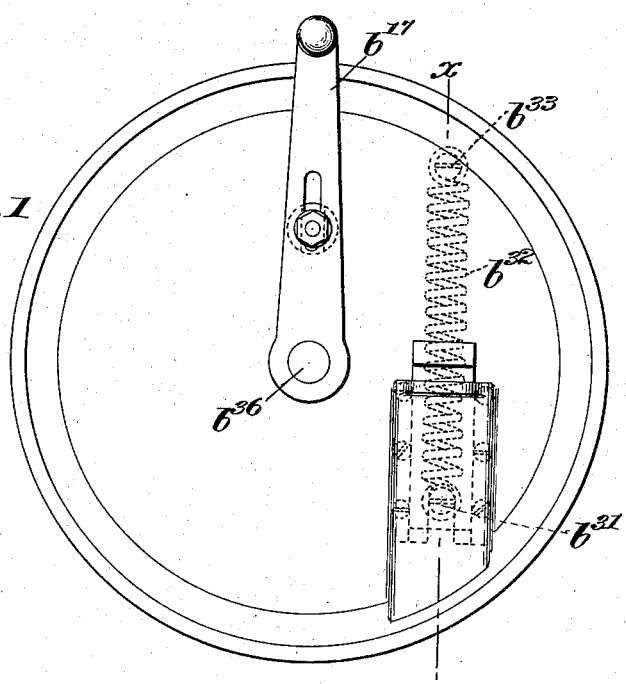

No. 662,894. Patented Nov. 27, 1900.
W. W. DIXON.
CLUTCH PULLEY.
(Application filed Apr. 29, 1898.)

(No Model.)

Witnesses.
Edward F. Allen.
James W. Urquhart.

Inventor:
William W. Dixon
by Crosby & Gregory
Attys.

THE NORRIS PETERS CO., PHOTO-LITHO., WASHINGTON, D. C.

UNITED STATES PATENT OFFICE.

WILLIAM W. DIXON, OF BOSTON, MASSACHUSETTS, ASSIGNOR TO THE REECE BUTTON HOLE MACHINE COMPANY, OF PORTLAND, MAINE.

CLUTCH-PULLEY.

SPECIFICATION forming part of Letters Patent No. 662,894, dated November 27, 1900.

Application filed April 29, 1898. Serial No. 679,175. (No model.)

*To all whom it may concern:*

Be it known that I, WILLIAM W. DIXON, of Boston, in the county of Suffolk and State of Massachusetts, have invented an Improvement in Clutch-Pulleys, of which the following description, in connection with the accompanying drawings, is a specification, like letters on the drawings representing like parts.

This invention describes an improvement applicable to the sewing-machine represented and described in United States Letters Patent No. 498,216, dated May 23, 1893. That patent describes a shaft which at times is rotated intermittingly at one speed and at other times has imparted to it a more rapid and continuous rotation. The shaft in the machine described in said patent has fast upon it at or near one end an arm provided at one side with a lump or tooth extended therefrom in the direction of the axis of rotation of said shaft, and loose on said shaft at one side of said arm is a pulley which is rotated continuously at a high speed, said pulley having a bunter extended from it next the side of said arm carrying the said lump or tooth. The shaft referred to performs two essential operations—viz., one to effect the change of relative position of a stitch-frame, it carrying the stitch-forming mechanism, and a cloth-frame, it carrying a cloth-clamp, and when said stitch-frame is being moved after material has been applied to the clamp to put the stitch-frame and stitch-forming mechanism into position to stitch the material in the clamp the shaft is rotated at its highest speed, and when the stitch-frame and stitch-forming mechanism arrive in the position where the stitch-forming mechanism is to commence and stitch the buttonhole the pulley which rotated the shaft at its highest speed is disengaged from said shaft, and at the same time a second continuously-rotating pulley is operatively joined to and controls the movement of said shaft at a slower speed, said movement being a step-by-step or intermittent movement while the stitching is taking place about the buttonhole, and the stitching having been finished and while the said shaft is being moved at its slower speed intermittingly the said faster-moving loose pulley is again put into inoperative engagement with and to rotate said shaft at its fastest speed. It will be noticed from the foregoing that the bunter of the continuously-rotating pulley engages the lump or tooth of the arm under two different conditions, the one engagement being effected when the shaft is at rest, and such engagement starts instantly into a quick speed the said shaft, the other engagement being when the shaft is being rotated, but at a slower speed, intermittingly. The belt-pulley referred to in said patent is under the control of a lever which may be moved automatically at the desired times in one or the other direction on or with relation to said shaft to cause said bunter to engage the lump or tooth of the arm, as when it may be desired to rotate the said shaft continuously, or to engage said shaft when partaking of its intermittent or slower rotations and move it at a faster speed, the opposite movement of the pulley disengaging the lump or tooth from the bunter, leaving the shaft at rest. The belt-pulley in said patent forms, therefore, part of a starting-clutch, the other part being the arm referred to, with its lump or tooth.

In practice it has been found that the contact of the bunter with the lump at the excessive high speed at which the pulley is being rotated produces a shock which wears and breaks the operative parts of the machine, and the lump and the bunter have frequently to be renewed. To obviate the hard shock referred to due to the contact of the bunter and lump when starting the said shaft from a condition of rest and also when starting it at a high rate of speed from a slower intermitting rotation, I have placed the bunter under the control of a spring, so that said bunter strikes the lump with a yielding blow, thus enabling the higher speed of the shaft to be started gradually.

Figure 2:
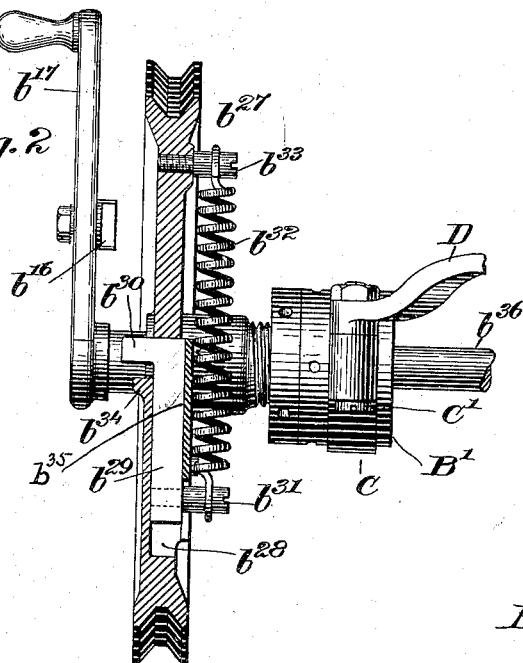

Figure 1 is an outside view showing the belt-pulley and its spring-held bunter and the arm having the lump or tooth. Fig. 2 is a section of the same in the line $x$, Fig. 1.

The shaft $b^{36}$, the arm $b^{17}$, connected therewith and provided with the lump or tooth $b^{16}$, and the belt-pulley $b^{27}$, mounted loosely on the said shaft $b^{36}$, are and may be substantially as shown in said patent. Herein the hub B' of the pulley $b^{27}$ is grooved to receive a finger or fork C, connected by a screw C' with a lever D, said lever being vibrated at proper times to move said pulley $b^{27}$ longitudinally on or with relation to said shaft $b^{36}$, in order that the said continuously-rotating pulley $b^{27}$ may be made to act as the driver for the said shaft $b^{36}$ when necessary, as provided for in said patent. The inner face of the pulley $b^{27}$ is herein shown as provided with a pocket or guideway $b^{28}$, in which the shank $b^{29}$ of a bunter $b^{30}$ is supported for sliding movement, the said shank being held in said pocket by means of the plate $b^{35}$, the head of the said bunter $b^{30}$ projecting through the pulley and being in the proper position to engage the tooth $b^{16}$ on the arm $b^{17}$ whenever the pulley $b^{27}$ is moved longitudinally on or with relation to the shaft $b^{36}$, as described above. This bunter or shank has connected with it a stud $b^{31}$, which is engaged by a suitable strong spring $b^{32}$, the opposite end of said spring being engaged with a stud $b^{33}$, fixed to the said pulley $b^{27}$, the said spring normally keeping the said bunter with its outturned end away from the shoulder $b^{34}$ of the pulley.

The drawings show the parts in the condition they will occupy when the pulley $b^{27}$ is running loosely on the shaft $b^{36}$, and in this condition it may be assumed either that the shaft $b^{36}$ is at rest, as it will be when material containing a buttonhole to be stitched is being put into the clamp, or it may be considered that the said shaft is being moved intermittingly by the mechanism provided for in said patent, but at a slower speed, as while the stitching of a buttonhole is being carried on, as provided for in said patent, the shaft $b^{36}$ in said patent, also common to this application, being in practice rotated continuously at a high speed before the commencement of stitching a buttonhole and after the buttonhole has been stitched, said shaft having a step-by-step slower motion imparted to it during the stitching of a buttonhole. To enable this continuously-rotating high-speed pulley to engage by its yielding bunter the lump or tooth connected with the arm carried by said shaft $b^{36}$, said pulley $b^{27}$ will be moved by the lever D, common to said patent, suitably actuated in the direction of the arrow, near said pulley in Fig. 2, and said bunter in the rotation of the said pulley will meet the lump or tooth $b^{16}$. At the first contact of this bunter with said lump or tooth the spring $b^{32}$ yields slightly, thus relieving the shock of the blow from the shaft $b^{36}$ and the parts operated by it, and said bunter acting in this yielding manner keeps up its contact with said lump or tooth of said arm $b^{17}$ and drives the shaft $b^{36}$ so long as the pulley $b^{27}$ remains with the bunter in contact with said lump or tooth. When it is desired to release the shaft $b^{36}$ from the control of the continuously-rotating driving-pulley $b^{27}$, the said pulley will be moved laterally on said shaft away from the arm $b^{17}$ and its tooth $b^{36}$, and thereafter the rotation of the pulley $b^{27}$ will not turn with it the shaft $b^{36}$.

Having fully described my invention, what I claim as new, and desire to secure by Letters Patent, is—

1. The shaft $b^{36}$, having an arm fixed thereto and provided with a tooth, combined with a clutch-starting pulley mounted loosely on said shaft and provided at its inner side with a pocket or guideway, a bunter fitted to slide in said pocket or guideway, and a spring connected with said pulley and with said bunter and adapted to move the same longitudinally, said guideway and bunter being located wholly within the periphery of the said pulley, combined with means to move said pulley longitudinally on said shaft to effect the engagement of the said bunter with the tooth of the said fixed arm to start the shaft, the opposite movement of the said pulley causing the bunter to retire from said tooth, leaving the pulley free to be turned on the said shaft, substantially as described.

2. A starting-clutch device for buttonhole-sewing machines, the same consisting of a pulley adapted to be rotated constantly at a high speed about a shaft, said shaft having an arm provided with a rigid lump or tooth, a spring-supported bunter carried by said pulley, and means to change the position of said rapidly-rotating pulley in the direction of the axis of rotation of the said shaft to cause the bunter to engage at proper times the lump or tooth of the arm connected with the shaft, said pulley starting the shaft at a faster speed, said bunter yielding to the blow caused by engaging said lump or tooth and taking with it quickly the shaft.

3. A starting-clutch device for buttonhole-sewing machines, consisting of a shaft, having fast thereon an arm provided with a rigid tooth or lump, a pulley loosely mounted on said shaft and adapted to be constantly rotated at a high speed, the said pulley having on its inner face a pocket, an aperture through the pulley at the mouth of the said pocket, a spring-supported bunter having a shank fitted to slide in said pocket, the head of said bunter projecting through said aperture and extending beyond the outer face of the pulley, and means to shift the rapidly-rotating pulley longitudinally of the shaft to cause the bunter to engage at the proper time the lump or tooth on the said arm connected to the shaft, said bunter yielding under the impact of the blow caused by striking the tooth.

In testimony whereof I have signed my name to this specification in the presence of two subscribing witnesses.

WILLIAM W. DIXON.

Witnesses:
GEO. W. GREGORY,
MARGARET A. DUNN.